April 16, 1940.  W. B. KERRICK  2,197,271
CHECK VALVE
Filed Aug. 21, 1936
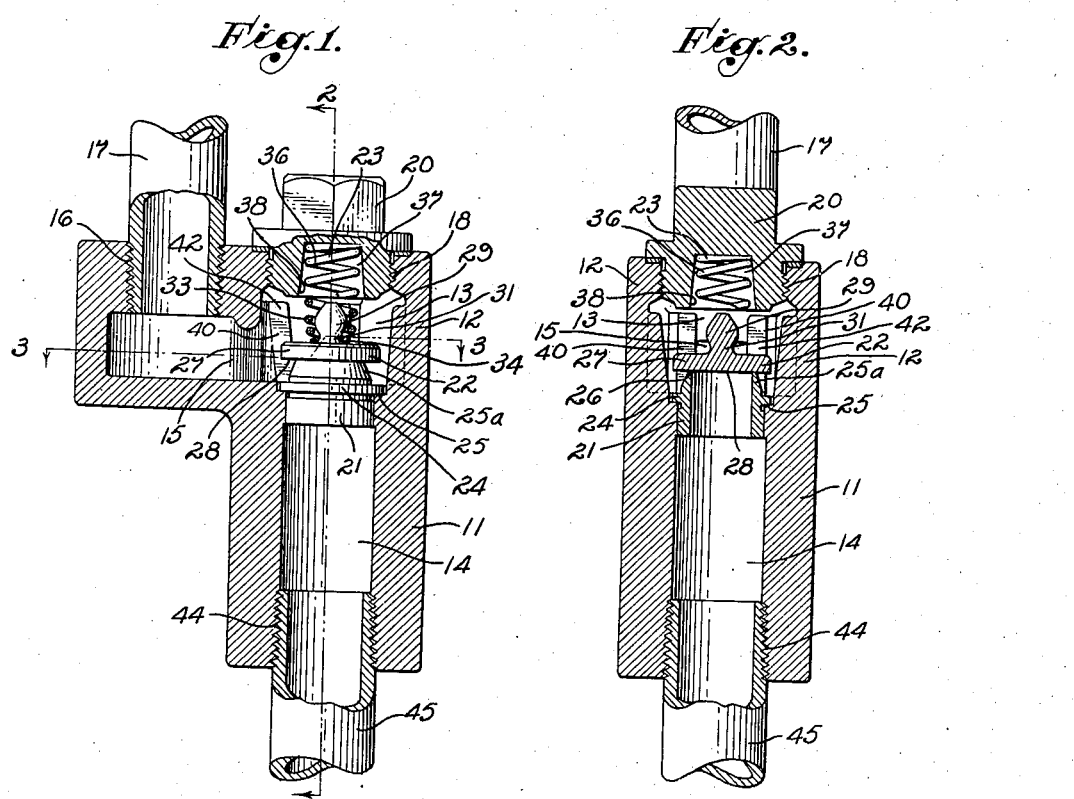
INVENTOR
WALTER B. KERRICK
BY
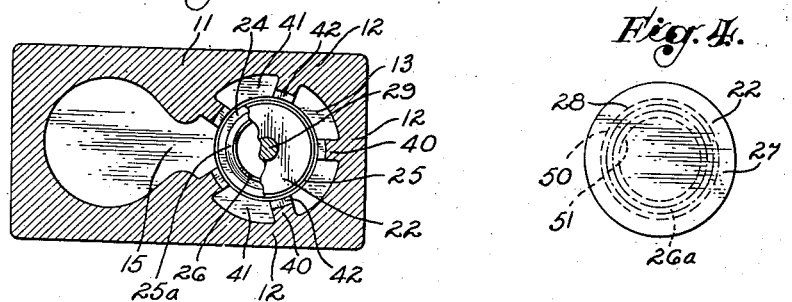
ATTORNEY.

Patented Apr. 16, 1940

2,197,271

UNITED STATES PATENT OFFICE 2,197,271

CHECK VALVE

Walter B. Kerrick, Los Angeles, Calif., assignor to Clayton Manufacturing Company, Alhambra, Calif., a corporation of California Application August 21, 1936, Serial No. 97,151

9 Claims. (Cl. 251—144)

My invention relates to a check valve for use in conduits carrying viscous fluids having small solids or fibrous materials therein, and relates in particular to a check valve especially suitable for use in conjunction with pumps employed to pump measured quantities of such fluids.

Although my invention may have uses in conjunction with many types of conduits, for purpose of simplicity in disclosure I shall limit this explanation to its utility in conjunction with pumps of the character hereinabove set forth. A type of such pump is used in conjunction with the soap making industry for the pumping of measured quantities of soap fats and alkaline solutions into a reaction member, such as a continuous heated coil, wherein the constituent elements are subjected to heat and intermixed so that formation of liquid soap results. These pumps are ordinarily of plunger type, and the proportioning and measurement of the soap making liquids is accomplished by reciprocating the pump piston at such speed that it will cause ejection from the pump of a desired number of volumes of liquid during a unit period of time. It is found very difficult to maintain the check valves associated with these pumps in such condition that they will close and open perfectly at all times, and accordingly it is difficult to maintain desired proportions of liquids delivered by the pumps owing to leakage occurring in either or both the inlet and discharge check valves. I have produced a very simple check valve which gives satisfactory results under conditions of operation such as those hereinabove described.

It is an object of the invention to provide a check valve having a valve seat and a valve closure member constructed and supported in such relation that small foreign particles or fibers which come into position between the valve seat and the closure member are within a short time passed on through the valve.

It is a further object of the invention to provide a valve in which the valve seat member is of such form that leakages caused by the presence of foreign materials between the valve seat and the valve closure member are maintained at a minimum.

It is a further object of the invention to provide a check valve wherein the wear on the actual valve surfaces is distributed in such a manner that grooving of one or the other of these members is not produced as the result of continued opening and closing of the valve, and in which valve the seating surfaces are kept in highly polished condition.

It is an object of the invention to provide a valve having a valve seat member with a flat valve seat presented toward the interior of the valve chamber, and a valve closure member having a flat face adapted to engage the flat valve seat, this closure member being supported in such a manner that it may oscillate relative to or in engagement with the valve seat so that a continuous polishing of the engaging surfaces occurs during the operation of the valve. A feature of the construction is that the valve closure member oscillates on the flat valve seat in lateral direction, with the result that the area polished on the face of the closure member as the result of its engagement with the valve seat is larger than the area of the valve seat engaged thereby. This distribution of wear on the face of the closure member avoids the rapid formation of cooperating groove-like profiles on the face of the valve closure member and the valve seat.

It is a further object of the invention to provide a check valve of the character set forth in the preceding paragraph wherein the relatively flat closure member is urged toward the valve seat by a force applied thereto in such a manner that one edge portion of the closure member may lift from the valve seat ahead of the opposite edge portion of the closure member. By this provision I have made a valve which opens freely, or in other words, with a minimum pressure differential on opposite sides of the valve closure member. For example, if one side of the valve closure member tends to stick down, the pressure against the lower face of such closure member will cause the free edge thereof to lift, which will break the adhesion of the closure member to the seat, whereupon the valve closure member may rise readily to its fully open position. From an observation of the manner in which wear takes place between the valve face of the closure member and the valve seat, it is believed that a circular or lateral oscillation of the closure member takes place, and that at times this lateral oscillation is combined with an angular oscillation or rocking movement of the valve closure member.

In accordance with the foregoing, it is an object of the invention to provide a check valve having a valve seat member provided with a tubular or cylindrical lip projecting into the valve chamber and having an annular, flat valve seat formed at the inner extremity thereof, which valve seat is engaged by a flat valve closure member having a diametral dimension so proportioned relative to the size of the valve chamber that the valve closure member may move laterally relative to the valve seat, together with a spring member so placed that it will urge the valve closure member toward the valve seat without keeping the valve closure member from the characteristic universal and laterally oscillating movement hereinabove referred to.

Further objects and advantages of the invention will be made evident throughout the following part of the specification.

Referring to the drawing, which is for illustrative purposes only,

Fig. 1 is a vertically sectioned view of the preferred form of my invention.

Fig. 2 is a sectional view taken as indicated by the line 2—2 of Fig. 1.

Fig. 3 is a cross section taken as indicated by the line 3—3 of Fig. 1.

Fig. 4 is a view showing the face of the valve closure member after it has been in service.

As shown in the drawing, I provide a valve casing 11 having walls 12 forming a valve chamber 13, there being an inlet passage 14 in the casing 11 leading into the valve chamber 13. An outlet passage 15 preferably leads laterally from the valve chamber 13 and is provided with a threaded portion 16 to which a discharge pipe 17 may be screwed. In alignment with the inlet passage 14 an internally threaded opening 18 leads outwardly from the chamber 13 and is adapted to have a plug 20 threaded therein, this plug 20 being removable so as to provide access to the valve chamber 13 in order that cooperating valve parts, comprising a valve seat member 21, a valve closure member 22, and a spring 23, may be placed therein.

The valve seat member 21 is of tubular form and has a projecting shoulder 24 adapted to engage a shoulder 25 at the inner end of the inlet passage 14 when the valve seat member 21 is pressed into place, as shown in the drawing. The inner end of the valve seat member 21 comprises a tubular or cylindrical portion 25a which projects inwardly from the shoulder 24 and likewise projects into the valve chamber 13. The inwardly projecting tubular portion 25a is tapered inwardly so that at the inner extremity thereof a very narrow annular valve seat 26 is formed, which valve seat lies in a plane normal to the axis of the valve seat member 21. It will be recognized that the flat valve seat 26 may be a knife edge in its original construction, but it is evident that a short period of use in conjunction with the valve closure member 22 will soon wear a definite flat face or seat on the inner extremity of the tubular portion 25a.

The valve closure member 22 comprises a circular plate or disc 27 having a front face or seat 28, and having a partly spherical projection 29 connected to the rearward portion thereof by means of a neck 31. The diameter of the chamber 13 is greater than the diameter of the disc 27 in order that the closure member 22 may have limited lateral movement in the chamber 13 whereby the face 28 thereof may slide in engagement with the flat seat 26 of the valve seat member 21. The closure member 22 is urged toward the valve seat 26 by means of the spring 23 which is formed from a coil of spring wire in such a manner and of such size that the lower portion 33 thereof will pass around the projection 29 without engaging the same, there being a part 34 at the lower extremity of the spring 23 for engaging the neck 31 which connects the projection 29 to the plate 27, or fits closely around the neck but engages the plate 27 at its point of joinder with the neck 31. This constricted part 34 may consist of the final turn of the coil spring 23. The engagement of the spring 23 with the closure member 22 is pivotal in character, and the yieldable force of the spring 23 is exerted in the middle of the plate 27. The upper or outer end 36 of the spring 23 is engaged in such a manner that it may swing laterally in accordance with the lateral movement of the closure member 22 in the chamber 13. To permit the spring 23 to pivot on its upper end, and at the same time to apply pressure to the spring to compress the same, the plug 20 is provided with a pocket 37 which tapers downwardly and outwardly relative to the spring 23 so that a clearance is provided between the lip 38 around the lower extremity of the pocket 37 and the spring 23. The walls 12 are formed so as to provide ribs 40 projecting radially inwardly, there being vertical channels 41 existing between the ribs 40, and the inner faces 42 of the ribs 40 being disposed essentially in a circle and defining the limits of the lateral movement of the closure member 22.

The inlet passage 14 of the valve casing 11 is shown with threads 44 whereby it may be connected to a discharge pipe 45 of a volumetric pump, not shown. The inner extremity of the tubular portion 25a is relatively sharp, and the annular flat seat 26 is of very small area. Accordingly, the pressure of the valve closure member 22 against the seat 26 is relatively high per unit area of the area of engagement of these cooperating valve members 21 and 22; therefore, fibrous materials which may stop in positions between the annular valve seat 26 and the face 28 are compressed to a minimum thickness, and if the materials stopping between the seat 26 and the face 28 are relatively soft, the knife edge formation of the inner portion 25 will cut partly or entirely through such materials and the vibration and washing effect prevents clogging of the valve by fibers.

The washing effect is a feature of my invention provided by the arrangement shown in the drawing. Suppose, for example, the closing of the valve severs a mass of soft fibrous material into portions adhering to the face 28 of the plate 27 and to the inner and outer peripheral surfaces of the tubular member 25a. When the valve is subsequently opened, the incoming stream of fluid will wash the inner peripheral surface of the tubular member 25a and strike against the face 28 of the closure member to dislodge material adhering thereto. Since the face 28 overhangs the annular recess around the tubular member 25a, the incoming stream will be deflected by the face 28 into that annular space, and since the annular space communicates peripherally with the outlet passage 15, the fluid stream will flush out the annular space, washing material from the outer peripheral surface of the tubular member 25a. It will be noted that although the ribs 40 extend downward into the annular space, sufficient clearance is provided to permit fluid to sweep around the annular space to the outlet 15. Where a valve seat, such as shown at 26, of small area is applied to the surface of a cooperating closure member, there is a tendency for the relatively sharp valve seat to cut a groove in the surface of the co-operating member, and after this groove is formed, it is difficult to prevent leakage of the valve. In my valve, however, there is a constant lateral and lateral oscillating movement of the valve closure member 22 on the annular valve seat 26, with the result that the wear of the valve seat 26 on the face 28 is not concentrated, but to the contrary is distributed over an annular area much wider than the valve seat 26. In Fig. 4 I have by dotted lines 26a indicated the annular area of engagement between the valve seat 26 and the face 28 of the valve closure member 22. Due to the lateral movement of the closure member 22, which lateral movement is believed to be of oscillating character, an annular area such as indicated by dotted lines 50 and 51 will be noted on the face 28 of the valve member 22 after a period of oscillation, this area being highly polished and smooth, indicating that there has been a constant lapping movement taking place between the valve seat 26 and an annular portion of the face 28 of the member 22. It is at times found that a check valve closure member may tend to stick to the seat due to the presence of materials of adhesive character, and that if the closure member is to be lifted straight or without tilting or rotation, a considerable force must be exerted. Owing to the pivotal manner in which the valve closure member 22 is engaged by the spring 23, free rotation of the closure member 22 is permitted, and one side of the valve closure member 22 may lift independently of the opposite side of such closure member with what may be termed a rocking action. Likewise, if the presence of foreign substance from one side of the valve seat 26 prevents complete closure of one side of the member 22, the opposite side of the valve closure member 22 may move independently into engagement with the adjacent, unobstructed portion of the valve seat 26.

Another feature of my invention is that the ribs 40 are, by preference, inclined inwardly toward the inlet of the valve chamber. The virtue of this arrangement is that while the ribs serve to guide the valve closure member in its downward movement and to restrict the lateral freedom of the closure member on the valve seat, the ribs provide substantial radial clearance for flow when the valve is opened. As the valve closure member moves upward, the ribs provide increasing clearance for flow past the valve closure member into the upper portion of the valve chamber, which upper portion, as shown in the drawing, is in direct communication with the outlet passage 15.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A check valve of the character described, including: walls forming a valve chamber having an inlet opening and an outlet opening; a valve seat member disposed in said inlet opening, said valve seat member having a tubular lip projecting into said valve chamber and having a flat valve seat at the inner extremity thereof, there being an annular space around said lip back of said valve seat; a valve closure member in said chamber comprising a flat plate having a flat face presented to said valve seat, there being a projection on the back face of said plate connected to said plate by means of a neck of reduced diameter; and a spring member having an engagement part engaging said neck of said valve closure member, said spring member being placed so as to urge said valve closure member toward said valve seat, there being inwardly inclined guide ribs for said valve closure member in said chamber disposed around the periphery of said valve closure member and being spaced from the periphery of said valve closure member so as to permit lateral movement thereof on said valve seat.

2. A check valve of the character described, including: walls forming a valve chamber having an inlet opening and an outlet opening; a valve seat member disposed in said inlet opening, said valve seat member having a tubular lip projecting into said valve chamber and having a flat valve seat at the inner extremity thereof, there being an annular space around said lip back of said valve seat; a valve closure member in said chamber comprising a flat plate having a flat face presented to said valve seat, there being a projection on the back face of said plate connected to said plate by means of a neck of reduced diameter; a coil spring having an engagement member at one end thereof for engaging said neck of said closure member, the other end of said spring extending outwardly from said closure member in axial direction relative thereto; and means in said chamber in opposing relation to said valve seat having a pocket facing said valve seat and receiving said other end of said spring, there being inwardly inclined guide ribs for said valve closure member in said chamber disposed around the periphery of said valve closure member and being spaced from the periphery of said valve closure member so as to permit lateral movement thereof on said valve seat.

3. A check valve of the character described, including: walls forming a valve chamber having an inlet opening and an outlet opening; a valve seat member disposed in said inlet opening, said valve seat member having a tubular lip projecting into said valve chamber and having a flat valve seat at the inner extremity thereof, there being an annular space around said lip back of said valve seat; a valve closure member in said chamber comprising a flat plate having a flat face presented to said valve seat, there being a projection on the back face of said plate connected to said plate by means of a neck of reduced diameter; a coil spring tapering toward said valve closure member and having the contiguous end thereof reduced in diameter so as to form an engagement member at said end of said spring for engaging said neck of said closure member, the other end of said spring extending outwardly from said closure member in axial direction relative thereto; and means in said chamber in opposing relation to said valve seat having a pocket facing said valve seat and receiving said other end of said spring, there being inwardly inclined guide ribs for said valve closure member in said chamber disposed around the periphery of said valve closure member and being spaced from the periphery of said valve closure member so as to permit lateral movement thereof on said valve seat.

4. A check valve of the character described for fluids containing solids, said valve having a body including walls forming a valve chamber having an inlet opening and an outlet opening, said openings being laterally offset and extending in the same general direction relative to said body; a continuous wall extending into said chamber and forming a valve seat for said inlet opening; a valve member in said valve chamber having a flat face presented to said valve seat, said face being substantially wider than said valve seat, said valve member being substantially smaller in cross-section than the space defined by the surrounding walls of said chamber to permit substantial lateral freedom of movement of the valve member on the valve seat whereby the surface on said member subject to wear by contact with said seat is of substantially greater area and radial width than said seat; and a spring pressing said valve member towards said valve seat, one end of said spring having a connection with said valve member arranged to permit unrestrained pivotal movement of said valve member relatively to said spring but restraining substantial lateral movement of said valve member relative to said spring.

5. A check valve of the character described for fluids containing solids, said valve having: walls forming a valve chamber having an inlet opening and an outlet opening; a continuous wall extending into said chamber and forming a valve seat for said inlet opening; a valve member in said valve chamber having a flat face presented to said valve seat; guide ribs extending inwardly from opposite walls of said valve chamber and having upright edges radially spaced from said continuous wall and valve seat to limit lateral movement of said valve member, said valve member being substantially wider than said valve seat but substantially narrower than the diametrical distance between said ribs whereby the surface on said valve member subject to wear by contact with said seat is of substantially greater area and radial width than said seat, there being a continuous channel around said valve seat inside said ribs communicating radially with said outlet opening through said ribs; a spring pressing said valve member against said valve seat; and means upon the upper side of said valve member cooperating with one end portion of said spring for limiting the transverse movement of said valve member relative to said spring.

6. A check valve of the character described for fluid containing solids, said valve having: walls forming a valve chamber having an inlet opening and an outlet opening in a horizontal plane with a restricted passage between said openings; a cylindrical wall extending into said valve chamber having an extremity forming a generally knife-like annular seat effective for severance of soft solids; a circular valve member in said valve chamber having a flat face for engagement with said annular valve seat, said valve member being substantially larger in diameter than said annular valve seat and being substantially smaller in diameter than the surrounding walls of said valve chamber to permit substantial free lateral movement of said valve member on said valve seat whereby the surface of said valve member subject to wear by contact with said annular valve seat is of substantially greater outside diameter and substantially less inside diameter than said annular valve seat; a spring pressing said valve member toward said annular valve seat; and means projecting upwardly from the upper side of said valve member cooperating with one end portion of said spring for restraining substantial lateral movement of said valve member relative to said end portion of said spring.

7. A check valve of the character described for fluids containing solids, said valve having: a body including walls forming a valve chamber having laterally offset inlet and outlet openings in a horizontal plane with a restricted passageway therebetween; a cylindrical wall in said valve chamber having a portion of its outer surface chamfered upwardly and inwardly to form a thin annular valve seat, the chamfered portion of said cylindrical wall being spaced from said valve chamber walls to form an annular space of substantial cross sectional area around said valve seat, said annular space being in direct communication radially with said outlet opening through said restricted passageway; a substantially circular valve member in said valve chamber having a plain flat side face for engagement with said annular valve seat, said valve member being of substantially greater diameter than said valve seat to overhang said annular space but being substantially less in diameter than the distance between opposed sides of said valve chamber walls to permit substantial free lateral movement of said valve member on said valve seat, whereby the surface on said valve member subject to wear by contact with said annular valve seat is of substantially greater area and radial width than said valve seat; and a spring flexibly engaging said valve member and pressing the same against said valve seat, the upper face of said valve member having means cooperable with said spring to limit the relative transverse movement of said valve member with respect to said spring.

8. A check valve of the character described for fluids containing solids, said valve having: walls forming a valve chamber having an inlet opening and an outlet opening; a continuous wall in said valve chamber providing a valve seat having a thin end face for severance of soft solids, said continuous wall being spaced from said valve chamber walls to form a substantial channel around said valve seat; a plurality of diametrically opposed guide ribs projecting inwardly from the side walls of said valve chamber and spaced radially outwardly of said channel; a valve member in said valve chamber having a flat surface for engagement with said valve seat, said valve member being of substantially greater width than said valve seat to overhang said channel for diversion of fluid thereinto for flushing out said channel, but being substantially less in width than the diametrical distance between said guide ribs to permit substantial lateral movement of said valve member on said seat whereby the surface on said valve member subject to wear by contact with said valve seat is of substantially greater area and radial width than said valve seat; and a spring pressing said valve member against said valve seat, the upper face of said valve member having means cooperable with said spring to limit the relative transverse movement of said valve member with respect to said spring.

9. A check valve of the character described, including: walls forming a valve chamber having an inlet opening and an outlet opening; a valve seat arranged at the inner end of said inlet opening comprising a tubular lip projecting into said valve chamber and terminating in a thin annular end surface, there being an annular space around said lip below the plane of said annular end surface communicating directly with said outlet opening; a valve member in said valve chamber having a flat surface for engagement with said valve seat; and a spring in said valve chamber pressing said valve member toward said valve seat, one end of said spring being connected to said valve member, said connection being such that it permits unrestrained pivotal movement of said valve member on said end of said spring while restraining substantial lateral movement of said valve member relative to said end of said spring.

WALTER B. KERRICK.